United States Patent
Peirce

(10) Patent No.: US 11,002,142 B2
(45) Date of Patent: May 11, 2021

(54) THERMALLY COMPENSATED SYNCHRONIZATION RING OF A VARIABLE STATOR VANE ASSEMBLY

(71) Applicant: United Technologies Corporation, Farmington, CT (US)

(72) Inventor: Tristan Thomas Peirce, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 145 days.

(21) Appl. No.: 16/252,976

(22) Filed: Jan. 21, 2019

(65) Prior Publication Data

US 2020/0232335 A1 Jul. 23, 2020

(51) Int. Cl.
*F01D 9/04* (2006.01)
*F01D 17/16* (2006.01)
*F02C 9/22* (2006.01)

(52) U.S. Cl.
CPC ........... *F01D 9/041* (2013.01); *F01D 17/162* (2013.01); *F02C 9/22* (2013.01); *F05D 2220/32* (2013.01); *F05D 2240/12* (2013.01)

(58) Field of Classification Search
CPC .......... F01D 17/162; F01D 9/04; F01D 9/041; F01D 11/24; F01D 11/22; F02C 7/042
See application file for complete search history.

(56) References Cited

U.S. PATENT DOCUMENTS

| 5,601,401 A | 2/1997 | Matheny |
| 5,807,072 A | 9/1998 | Payling |
| 8,297,918 B2 * | 10/2012 | Bhatnagar ............. F01D 17/162 415/160 |
| 9,988,926 B2 | 6/2018 | Gasmen et al. |
| 10,060,439 B2 * | 8/2018 | Zotz ...................... F04D 29/544 |
| 10,227,888 B2 * | 3/2019 | Holowczak ........... F04D 29/584 |
| 2012/0076641 A1 | 3/2012 | Jarrett, Jr. et al. |

FOREIGN PATENT DOCUMENTS

EP 1808579 A2 7/2007

OTHER PUBLICATIONS

European Search Report for Application No. 19210738.1; dated: May 14, 2020.

* cited by examiner

*Primary Examiner* — Todd E Manahan
*Assistant Examiner* — Thuyhang N Nguyen
(74) *Attorney, Agent, or Firm* — Cantor Colburn LLP

(57) ABSTRACT

A variable vane assembly including a variable stator vane disposed in a main flow gaspath, the variable stator vane having a vane stem. The assembly also includes a case located at a radially outward location of the variable stator vane, the vane stem extending through a port of the case, the port defined by a port wall, a clearance defined by the vane stem and a port wall to allow gas from the main flow gaspath to pass therethrough. The assembly further includes a synchronization ring spaced from the case to define a gap. The assembly yet further includes a vane arm operatively coupled to a synchronization ring and to the vane stem, the vane arm redirecting gas from the main flow gaspath to the synchronization ring.

17 Claims, 3 Drawing Sheets

THERMALLY COMPENSATED SYNCHRONIZATION RING OF A VARIABLE STATOR VANE ASSEMBLY

STATEMENT OF FEDERAL SUPPORT

This invention was made with Government support awarded by the United States. The Government has certain rights in the invention.

BACKGROUND

Exemplary embodiments pertain to the art of gas turbine engines and, more particularly, to a thermally compensate synchronization ring of a variable stator vane assembly.

Some turbine engines include a plurality of engine sections such as, for example, a fan section, a compressor section, a combustor section and a turbine section. The turbine engine may also include a variable area vane arrangement. Such a vane arrangement may be configured to guide and/or adjust the flow of gas into a respective one of the engine sections. Alternatively, the vane arrangement may be configured to guide and/or adjust the flow of gas between adjacent stages of a respective one of the engine sections. Some variable area vane arrangements include a plurality of adjustable stator vanes that are rotatably connected to an inner and outer vane platforms, or engine casing walls. Each of the stator vanes may be rotated about a respective axis using a vane arm. A vane arm may be a sheet metal or machined piece that transmits load from a synchronizing ring to a variable vane stem.

Variable vane accuracy is a challenge that directly impacts the stall margin of an engine's fan and compressor. Accuracy is directly impacted by thermal differences between an actuation system's synchronization ring and the case it is mounted on because these thermal differences impact the positioning of the synchronization ring. Active thermal compensation solutions are typically avoided due to the significant weight impact.

BRIEF DESCRIPTION

Disclosed is a variable vane assembly including a variable stator vane disposed in a main flow gaspath, the variable stator vane having a vane stem. The assembly also includes a case located at a radially outward location of the variable stator vane, the vane stem extending through a port of the case, the port defined by a port wall, a clearance defined by the vane stem and a port wall to allow gas from the main flow gaspath to pass therethrough. The assembly further includes a synchronization ring spaced from the case to define a gap. The assembly yet further includes a vane arm operatively coupled to a synchronization ring and to the vane stem, the vane arm redirecting gas from the main flow gaspath to the synchronization ring.

In addition to one or more of the features described above, or as an alternative, further embodiments may include that the vane arm comprises at least one channel to redirect gas from the main flow gaspath to the synchronization ring.

In addition to one or more of the features described above, or as an alternative, further embodiments may include that the variable stator vane is a buttonless stator vane.

In addition to one or more of the features described above, or as an alternative, further embodiments may include that the gas redirected to the synchronization ring reduces a temperature difference between the synchronization ring and the case.

In addition to one or more of the features described above, or as an alternative, further embodiments may include that the case comprises a bumper pad extending radially outwardly from the case, the synchronization ring axially aligned with the bumper pad.

In addition to one or more of the features described above, or as an alternative, further embodiments may include a bushing disposed within the port of the case.

In addition to one or more of the features described above, or as an alternative, further embodiments may include that the bushing is press fit to the port wall.

Also disclosed is a variable vane assembly including a case at least partially defining a main flow gaspath. The assembly also includes a synchronization ring radially spaced from the case to define a gap therebetween. The assembly further includes a plurality of variable stator vanes disposed in the main flow gaspath and circumferentially spaced from each other. The assembly yet further includes a plurality of vane arms, each of the vane arms operatively coupled to the synchronization ring and to one of the plurality of variable stator vanes, each of the variable stator vanes having a vane stem extending through a port of the case, the port defined by a port wall, a clearance defined by the vane stem and a port wall to allow gas from the main flow gaspath to pass therethrough.

In addition to one or more of the features described above, or as an alternative, further embodiments may include that the vane arm is shaped to redirect gas from the main flow gaspath to the synchronization ring.

In addition to one or more of the features described above, or as an alternative, further embodiments may include that the vane arm comprises at least one channel to redirect gas from the main flow gaspath to the synchronization ring.

In addition to one or more of the features described above, or as an alternative, further embodiments may include that the variable stator vane is a buttonless stator vane.

In addition to one or more of the features described above, or as an alternative, further embodiments may include that the gas redirected to the synchronization ring reduces a temperature difference between the synchronization ring and the case.

In addition to one or more of the features described above, or as an alternative, further embodiments may include that the case comprises a bumper pad extending radially outwardly from the case, the synchronization ring axially aligned with the bumper pad.

In addition to one or more of the features described above, or as an alternative, further embodiments may include a bushing disposed within the port of the case.

In addition to one or more of the features described above, or as an alternative, further embodiments may include that the bushing is press fit to the port wall.

Further disclosed is a gas turbine engine including a compressor section, a combustor section, a turbine section, and a variable vane assembly. The variable vane assembly includes a case at least partially defining a main flow gaspath. The variable vane assembly also includes a synchronization ring radially spaced from the case to define a gap therebetween, the case comprising a bumper pad extending radially outwardly from the case, the synchronization ring axially aligned with the bumper pad. The variable vane assembly further includes a buttonless stator vane disposed in the main flow gaspath and circumferentially spaced from each other. The variable vane assembly yet further includes a vane arm operatively coupled to the synchronization ring and to the stator vane, the stator vane having a vane stem extending through a port of the case, the port defined by a port wall, a clearance defined by the vane stem and a port wall to allow gas from the main flow gaspath to pass therethrough, the vane arm redirecting gas from the main flow gaspath to the synchronization ring.

In addition to one or more of the features described above, or as an alternative, further embodiments may include that the vane arm comprising at least one channel to redirect gas from the main flow gaspath to the synchronization ring.

In addition to one or more of the features described above, or as an alternative, further embodiments may include that the gas redirected to the synchronization ring reduces a temperature difference between the synchronization ring and the case.

In addition to one or more of the features described above, or as an alternative, further embodiments may include that the variable vane assembly is located proximate an inlet of the compressor section.

In addition to one or more of the features described above, or as an alternative, further embodiments may include a bushing disposed within the port of the case

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
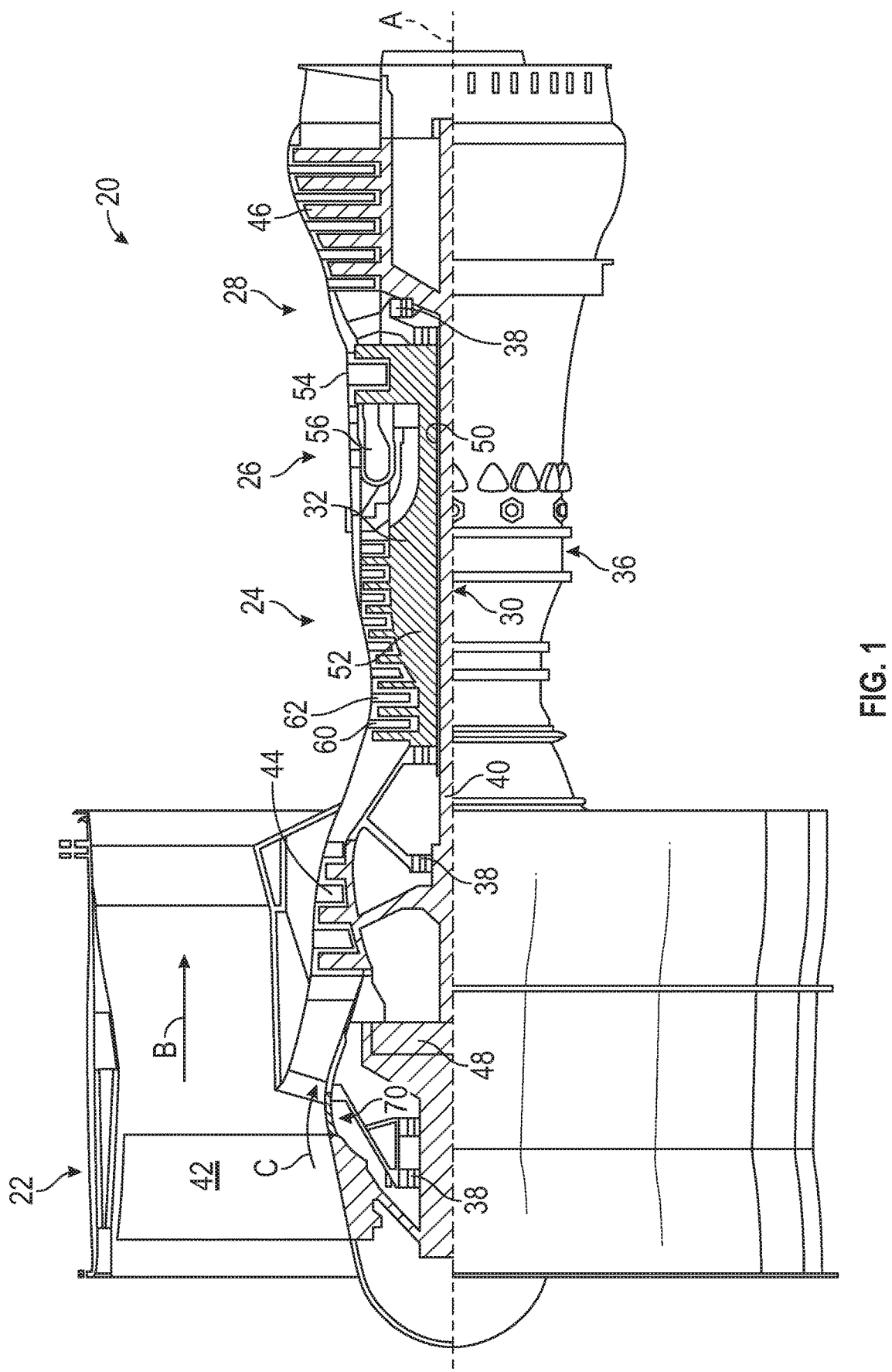
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, and turbine section 28 may be varied.

With continued reference to FIG. 1, the engine 20 also includes one or more variable area vane assemblies; e.g., vane assemblies 60, 62, etc. The vane assemblies direct gas for a respective engine section. In the illustrated example, vane assembly 60 guides and/or adjusts the flow of the core air into the compressor section 24. Vane assembly 62 guides and/or adjusts the flow of the core air through the HPC section 24; e.g., between adjacent HPC rotor stages.

Figure 2:
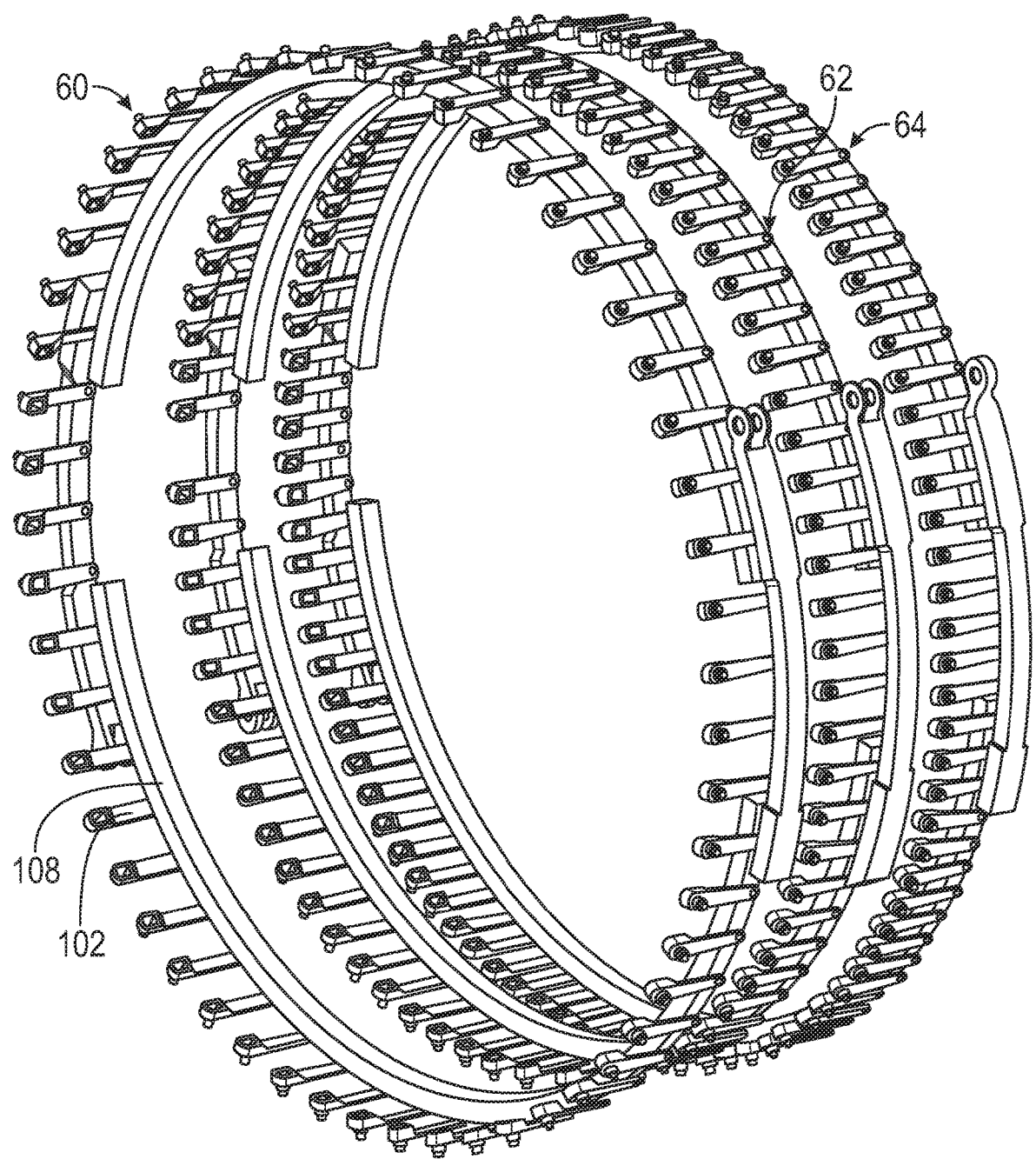
FIG. 2 is a perspective view of a variable vane assembly of the gas turbine engine.

Referring now to FIG. 2, three vane assemblies 60, 62, 64 are illustrated. The number of assemblies may vary depending upon the particular application. Regardless of the number of vane assemblies, each assembly includes one or more adjustable stator vanes that are arranged circumferentially around the central axis. Each of the stator vanes may be rotated about its respective axis by pivoting a respective vane arm assembly 100 with an actuator (not shown).

Figure 3:
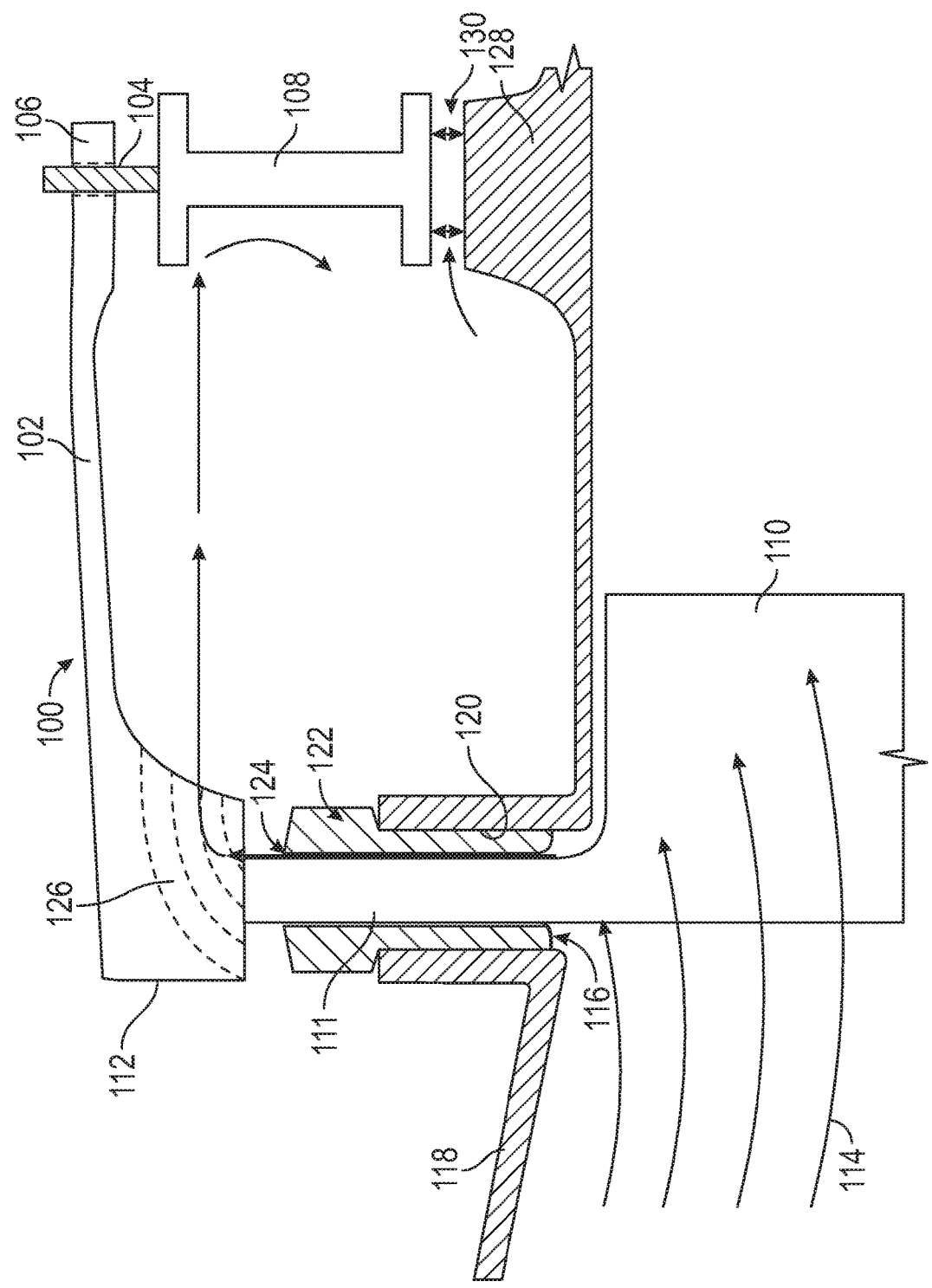
FIG. 3 is a cross-sectional view of a vane arm assembly of the variable vane assembly.

Referring to FIG. 3, the vane arm assembly 100 is illustrated in greater detail. The vane arm assembly includes a vane arm 102. The vane arm 102 is operatively coupled to the actuator with a pin 104 proximate a first end 106 of the vane arm 102. The pin is part of, or operatively coupled to, a synchronization ring 108 that synchronizes the movement of a plurality of circumferentially spaced stator vanes 110 (FIG. 2). The vane arm 102 is coupled to a vane stem 111 of one of the stator vanes 110 proximate a second end 112 of the vane arm 102.

FIG. 3 shows a single stator vane and vane arm, but it is to be appreciated that some or all of the additional stator vanes may include the features described herein. For brevity of discussion, a single stator vane 110 and a single vane arm 102 are described herein. As shown, the stator vane 110 is disposed within a main flow gaspath 114 to adjust the gas flow therethrough. The vane stem 111 extends radially outwardly from the main portion of the stator vane 110 through a port 116 of a case 118 that at least partially defines the main flow gaspath 114. The port 116 is defined by a port wall 120 and has a circular cross-section in some embodiments. A bushing 122 is disposed at least partially within the port 116.

The stator vane 110 is referred to as a "buttonless" stator vane. This term describes a vane that does not include a structural feature that engages the case 118. The structural feature, which may be referred to as a button impedes, or fully blocks, main flow gaspath gas from readily escaping the main flow gaspath to enter a plenum or engine bay that is located radially outward of the case 118. The buttonless stator vane 110 disclosed herein results in a clearance 124 between the vane stem 111 and a surrounding structure (e.g., port wall 120, bushing 122, etc.). The clearance 124 fluidly couples the main flow gaspath 114 and the engine bay via redirection by the vane arm 102, as described herein. The gas naturally tends to flow through the clearance 124 due to the pressure differential between the main flow gaspath 114 (i.e., high) and the engine bay (i.e., lower).

The gas escaping through the clearance 124 is effectively a jet of gas flowing radially outwardly. To redirect the jet of gas, the vane arm 102 is shaped or contoured to direct the gas toward a structural component that is to be thermally effected by the hot gas leaving the main flow gaspath 114. The vane arm 102 may have an outer surface that is curved to effect the desired redirection or may include one or more channels 126 that are formed therein to effect the desired redirection.

In the illustrated embodiment, the gas is redirected to contact the synchronization ring 108. The synchronization ring 108 is axially aligned with a portion of the case 118 that protrudes radially outward. This portion of the case 118 is referred to as a bumper pad 128. The synchronization ring 108 is radially spaced from the bumper pad 128 to define a gap 130. The gap 130 is designed to accommodate a maximum relative deflection of the synchronization ring 108 and the bumper pad 128 that occurs due to a temperature difference between the synchronization ring 108 and the bumper pad 128. The larger temperature difference that occurs during operation requires a larger gap between the synchronization ring 108 and the bumper pad 128. The larger gap that is required inherently reduces the achievable accuracy of the synchronization ring 108 which is the largest contributor to variable vane positional error.

In operation, the redirected gas that is flowed into contact with the synchronization ring 108 reduces the temperature difference between the synchronization ring 108 and the case 118 since the temperature of the synchronization ring 108 is being directly influenced by the temperature of the gas being extracted directly from the main flow gaspath 114. This allows a reduction in the necessary design gap, thereby improving the accuracy at both the worst case condition (i.e., maximum temperature difference), as well as all other thermal conditions.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A variable vane assembly comprising:
   a variable stator vane disposed in a main flow gaspath, the variable stator vane having a vane stem;
   a case located at a radially outward location of the variable stator vane, the vane stem extending through a port of the case, the port defined by a port wall, a clearance defined by the vane stem and a port wall to allow gas from the main flow gaspath to pass therethrough;
   a synchronization ring spaced from the case to define a gap; and
   a vane arm operatively coupled to the synchronization ring and to the vane stem, the vane arm having at least one channel to redirect gas from the main flow gaspath to the synchronization ring.

2. The variable vane assembly of claim 1, wherein the variable stator vane is a buttonless stator vane.

3. The variable vane assembly of claim 1, wherein the gas redirected to the synchronization ring reduces a temperature difference between the synchronization ring and the case.

4. The variable vane assembly of claim 1, the case comprising a bumper pad extending radially outwardly from the case, the synchronization ring axially aligned with the bumper pad.

5. The variable vane assembly of claim 1, further comprising a bushing disposed within the port of the case.

6. The variable vane assembly of claim 5, wherein the bushing is press fit to the port wall.

7. A variable vane assembly comprising:
   a case at least partially defining a main flow gaspath;
   a synchronization ring radially spaced from the case to define a gap therebetween;
   a plurality of variable stator vanes disposed in the main flow gaspath and circumferentially spaced from each other; and
   a plurality of vane arms, each of the vane arms operatively coupled to the synchronization ring and to one of the plurality of variable stator vanes, each of the variable stator vanes having a vane stem extending through a port of the case, the port defined by a port wall, a clearance defined by the vane stem and a port wall to allow gas from the main flow gaspath to pass therethrough, wherein at least one of the plurality of vane arms having at least one channel to redirect gas from the main flow gaspath to the synchronization ring.

8. The variable vane assembly of claim 7, wherein the vane arm is shaped to redirect gas from the main flow gaspath to the synchronization ring.

9. The variable vane assembly of claim 7, wherein the variable stator vane is a buttonless stator vane.

10. The variable vane assembly of claim 7, wherein the gas redirected to the synchronization ring reduces a temperature difference between the synchronization ring and the case.

11. The variable vane assembly of claim 7, the case comprising a bumper pad extending radially outwardly from the case, the synchronization ring axially aligned with the bumper pad.

12. The variable vane assembly of claim 7, further comprising a bushing disposed within the port of the case.

13. The variable vane assembly of claim 12, wherein the bushing is press fit to the port wall.

14. A gas turbine engine comprising:
    a compressor section;
    a combustor section;
    a turbine section; and a variable vane assembly comprising:

a case at least partially defining a main flow gaspath;

a synchronization ring radially spaced from the case to define a gap therebetween, the case comprising a bumper pad extending radially outwardly from the case, the synchronization ring axially aligned with the bumper pad;

a buttonless stator vane disposed in the main flow gaspath and circumferentially spaced from each other; and a vane arm operatively coupled to the synchronization ring and to the buttonless stator vane, the buttonless stator vane having a vane stem extending through a port of the case, the port defined by a port wall, a clearance defined by the vane stem and a port wall to allow gas from the main flow gaspath to pass therethrough, the vane arm having at least one channel to redirect gas from the main flow gaspath to the synchronization ring.

15. The gas turbine engine of claim 14, wherein the gas redirected to the synchronization ring reduces a temperature difference between the synchronization ring and the case.

16. The gas turbine engine of claim 14, wherein the variable vane assembly is located proximate an inlet of the compressor section.

17. The gas turbine engine of claim 14, further comprising a bushing disposed within the port of the case.

* * * * *